United States Patent [19]

Black

[11] 4,231,178
[45] Nov. 4, 1980

[54] AUTOMATIC FISH SNATCHER

[76] Inventor: Donald L. Black, Rte. 29, Trotter Rd., Knoxville, Tenn. 37920

[21] Appl. No.: 964,629

[22] Filed: Nov. 29, 1978

[51] Int. Cl.³ .......................................... A01K 91/06
[52] U.S. Cl. ........................................ 43/16; 43/21.2
[58] Field of Search ...................... 43/15, 16, 17, 21.2, 43/22

[56] References Cited

U.S. PATENT DOCUMENTS

| | | | |
|---|---|---|---|
| 2,249,302 | 7/1941 | Smith | 43/21.2 |
| 2,523,356 | 9/1950 | Cherry | 43/21.2 |
| 2,727,707 | 12/1955 | Wells | 43/21.2 X |
| 2,740,219 | 4/1956 | Harden | 43/16 |
| 2,821,041 | 1/1958 | Hughes | 43/16 |
| 2,835,065 | 5/1958 | Schwartzkopf | 43/15 |
| 2,908,099 | 10/1959 | Burke | 43/16 |
| 2,944,361 | 7/1960 | Coulter | 43/16 |
| 2,996,824 | 8/1961 | Faycosh | 43/16 |
| 3,412,499 | 11/1968 | Pastrovich | 43/15 |
| 3,802,112 | 4/1974 | Banner | 43/21.2 |
| 3,914,894 | 10/1975 | Kobza | 43/15 |
| 4,004,365 | 1/1977 | Manchester | 43/17 |

Primary Examiner—Nicholas P. Godici
Assistant Examiner—Robert P. Olszewski
Attorney, Agent, or Firm—Pitts & Kesterson

[57] ABSTRACT

A hook setting apparatus which supports a fishing rod and is triggered responsive to the fish jerking on the bait secured to the rod through a fishing line. The apparatus includes a support member disposed in the substantially upright position which pivotally carries on its end portion a second member which supports a rod holder. A spring assembly biases the second member in a predetermined pivotal direction for setting the hook in the fish's mouth. A trigger assembly which is mounted on the support member maintains a second member in a predetermined pivotal position by counteracting the forces applied to the second member by the tension spring assembly. The trigger assembly releases the second member responsive to a fish jerking on the fishing pole such that the tension spring assembly thereby sets the hook in the fish's mouth. The force required to trigger the device can be adjusted such that fishes of various sizes will activate the device.

3 Claims, 7 Drawing Figures

AUTOMATIC FISH SNATCHER

BACKGROUND OF THE INVENTION

This invention relates to a hook setting device and more particularly a hook setting device which is adapted for setting a hook in a fish's mouth in response to the fish jerking on the fishing line which is connected to the pole or rod carried by the holder. The device is designed to be inexpensive to manufacture and can be readily assembled.

Fishermen often desire to leave their rods or poles unattended while fishing. However, it is desirable that the fishing rod be supported in such a manner that a fish, particularly a large fish cannot jerk the pole in the water while feeding on the bait. Moreover, it is desirable that the unattended pole be jerked in a direction opposite to the direction a fish tugs on the line during its feeding on the bait such that the hook will be set in the fish's mouth.

Heretofore, various rod holding and fish setting devices have been known. One prior fishing rod holder is disclosed in U.S. Pat. No. 3,154,875 which is directed to a combined rod holder and hook setting device having an elongated support stake which is inserted into the ground. The device includes a rather intricate spring assembly which is adapted for jerking the rod and rod holder in a direction opposed to the direction a fish tugs on a line during its feeding on the bait. Various other rod holders and hook setting devices are disclosed in U.S. Pat. Nos. 2,944,361; 2,986,834; 2,781,600; and 3,410,015. While hook setting devices have heretofore been known, various of the prior devices incorporate spring mechanisms and rod holders which are difficult and expensive to manufacture. Moreover, certain of the prior devices require frequent maintenance attention and do not incorporate features which assist in maximizing the optional positions that the rod is disposed during the fishing process.

Accordingly, it is an object of this invention to provide an improved rod holding and hook setting device. A further object of this invention is to provide a rod holding device which is inexpensive to manufacture and can be readily assembled. A still further object of this invention is to provide a rod holding device which incorporates an inexpensive audible alarm. A further object of this invention is to provide a rod holding and hook setting device which is adjustable as to the force required to trigger the device from its cocked position. Yet another object of the invention is to provide a device in which the rod position can be readily adjustable in a horizontal or vertical plane such that the rod can be positioned at a predetermined location. Other objects and advantages of the invention will become more apparent upon reviewing the detailed description together with the drawings in which:

Figure 1:
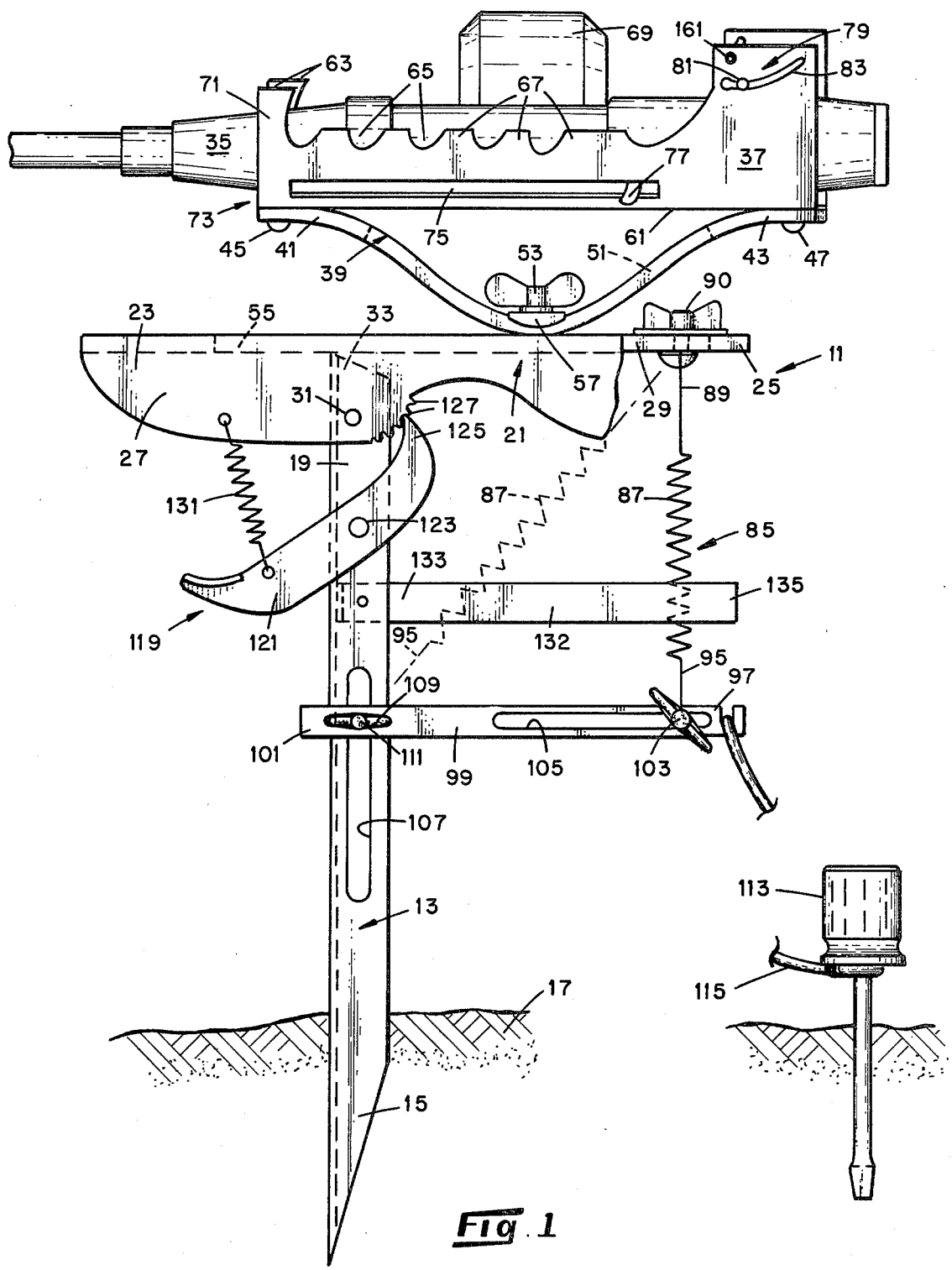
FIG. 1 is a side elevation view of a device constructed in accordance with various features of the invention and showing the rod and rod holder in the cocked position.

Referring now to the drawings, a hook setting apparatus constructed in accordance with various features of the invention is indicated generally at 11 in FIG. 1. The illustrated hook setting apparatus includes a first support member or leg 13 fabricated from a suitable rigid material such as plastic, aluminum, steel or the like. The depicted support member is L-shaped in cross-sectional outline, elongated and includes one end portion 15 which is pointed and suitable for penetrating the ground 17 such that the member 13 is maintained in a substantially upright position.

The opposite end portion 19 of the member 13 defines an opening which receives a pin 31 which pivotally supports the second or foot member 21. This member 21 includes a first end portion 23 and a further end portion 25 which are disposed on opposite sides of the end portion 19 of the support member 13 as shown in FIG. 1. In the illustrated embodiment the member 21 is substantially U-shaped in cross-sectional outline and includes a pair of depending members 27 which extend substantially perpendicularly from the central plate member 29. These members 27 define registering openings which receive the pin 31 which serves to pivotally mount the member 21 on the end portion 19 of the support member 13.

As shown in FIG. 1, the tip 33 of the end portion 19 is sloped and serves as a stop for the pivotal movement of the member 21. More specifically, the tip 33 engages the underside of the plate 29 upon moving the member 21 to a position substantially perpendicular to the support member 13. When the member 13 is in an upright position as shown in FIG. 1, this stop serves to maintain the rod 35 in a horizontal position, such that the tip (not shown) of the rod is substantially parallel with the horizontal.

A rod holder 37 is mounted on the foot member 21 and proportioned for receiving and supporting the handle portion of a fishing rod, fishing pole or the like. In this connection, an arcuate bracket 39 includes opposite end portions 41 and 43 which are secured at spaced locations to the holder 37 as by the illustrated rivets 45 and 47. The bracket 39 defines an elongated slot 51 which receives the shaft of a bolt 53 therethrough. This bolt 53 extends through an elongated slot 55 provided in the plate 29 of the foot member 21 and pivotally secures the bracket to the foot member. The angular position of the holder 37 and the rod 35, carried by the holder can be varied with respect to the foot member 21 by loosening the bolt 53, or by turning the wing nut, rotating the bracket to its desired position, and then tightening the bolt to rigidly secure the bracket and the foot member. A washer 57 having depending edge portions as illustrated in FIG. 1 is provided to assist in preventing the bracket 39 and the rod holder 37 from rotating in a horizontal plane in FIG. 1 subsequent to positioning and securing the rod holder and bracket at its desired location. It will be recognized that the bracket and holder can be rotated in horizontal and vertical planes with respect to the foot member plate 29 such that the rod can be positioned at a desired location and secured in such location by the bolt 53, thus adding flexibility to the apparatus.

The bracket 39 is slideably mounted on the plate 29 of the foot member. To this end, the bolt 53 slides within the slot 55 in the plate 29 until the bracket and the foot member are securely joined by tightening the bolt 53. The feature of slideably mounting the bracket and the holder 37 carried thereby assists in adjusting the threshold force, applied by the feeding fish, required to trigger the cocked apparatus as shown in FIG. 1.

Referring now to the holder 37 which is carried by bracket 39, the illustrated holder is substantially rectangular in outline to facilitate fabricating the holder from sheet metal. It will be recognized, however, that various cross-sectionally shaped holders fall within the scope of the disclosure, for example, the holder could be substantially circular. The holder 37 includes a substantially flat base plate 61 integrally formed at its opposite margins with a pair of upright members 63 which are substantially similar. These upright members 63 define a plurality of notches 65 and teeth 67, the latter of which serve to engage the shank of certain reels 69 and prevent the rod from sliding out of the holder when the foot member and/or holder are tilted with respect to the horizontal, particularly at angles of 45° or greater. The large teeth 71 at the forward portion 73 of the holder assist in preventing a fish from jerking the rod and reel out of the holder as when the apparatus is used to support a rod during trolling or when the rod is unattended.

In the illustrated embodiment, the holder 37 defines an elongated slot 75 which receives the gripping post 77 normally located on the underside of conventional rods. The opposite end portions of the slot 75 assist in limiting the sliding movement of the rod within the holder. This slot 55 can be defined in the upright members 63 and/or in the plate 61 of a holder having a substantially rectangular outline or at a predetermined location in the wall of a holder having, for example, a circular or arcuate cross-sectional outline. Moreover, the opposite ends of the slot 75 may serve as the only limit to the travel of the handle of a rod in the holder where the reel is of the type which does not have a shank that is engaged by the holder teeth 67.

In order to releasably secure the handle of a rod in the holder 37, a locking mechanism generally indicated at 79 is provided at the rearward portion of the holder. More specifically, the illustrated locking mechanism comprises a pin 81 which is slideably received at its opposite end portion of the arcuate and registering slots 83 defined by the upright members 63. The opposite end portions of the pin 81 are of increased diameter to prevent the pin from sliding out of the slots. As necessary or desired, a bolt could be used instead of a pin, with the head and a nut, on the threaded end of the bolt shaft, serving to prevent the bolt from disengaging the slots 83.

To mount the rod in the holder, the rod handle is positioned under the pin 81 and the forward portion of the handle is moved through the open upper portion of the holder and brought to rest against the plate 61. The pin 81 is then moved downwardly through the slots 83 until it securely engages the handle of the rod thereby locking the rod handle into position against the plate 61 of the holder. As necessary or desired, the slots 83 can be provided with a series of spaced openings of enlarged diameter to receive the opposite end portions of the pin when it is moved into its locking position against the rod handle.

Figure 3:
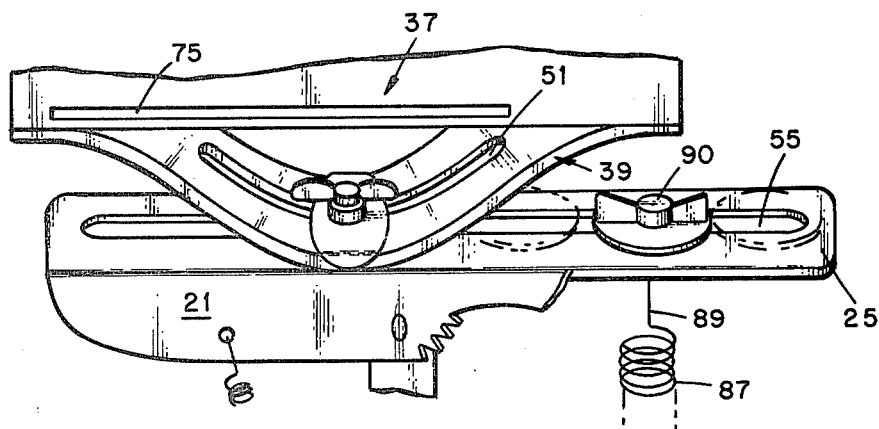
FIG. 3 is a perspective view of the member pivotally mounted on the upright support member together with a portion of the rod holder, with various portions of the device broken away for clarity.
Figure 4:
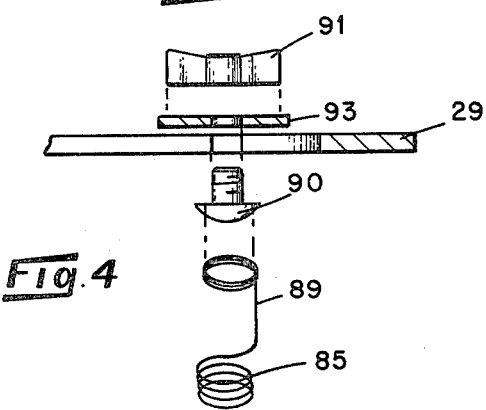
FIG. 4 is a side elevation view of a portion of the tension spring assembly which is exploded to illustrate how this portion of the tension spring assembly is assembled.
Figure 5:
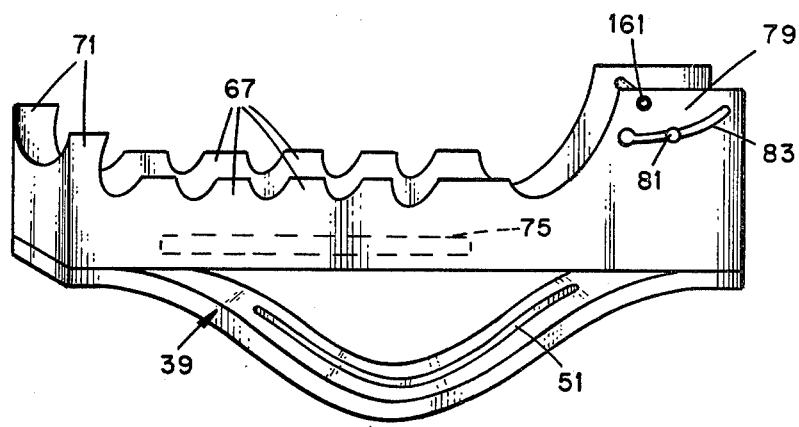
FIG. 5 is a perspective view of one embodiment of a rod holder.

A tension spring assembly generally indicated at 85 is provided for biasing the second member 21 in a predetermined pivotal direction for setting the hook in the fish's mouth. More specifically, the tension spring assembly 85 includes a tension spring 87 which is secured at its end portion 89 to the end portion 25 of the member 21. In this connection, the end portion 89 of the tension spring member is wrapped about the head of the bolt 90 which extends through the slot 55 provided in the plate 29 of the member 21. A wing nut 91 is secured to the opposite end portion of the shaft of the bolt 90 and a washer is interposed between the plate 29 of the member 21 and the wing nut. It will be noted in FIG. 3 that the position of the end portion 89 of the tension spring 87 can be adjusted along the length of the member 21 such that the biasing force exerted against the end portion 25 of the member 21 can be adjusted. Moreover, it will be noted in FIG. 3 that the position of the rod holder can be adjusted along the length of the slot 55 such that a further adjustment of the tension required to trigger the device is provided.

As shown in FIG. 1, the opposite end portion 95 of the tension spring 87 is secured to the end portion 97 of a cantilevered member 99 which is secured at its opposite end portion 101 to the upright support member 13. As shown in FIG. 1, the end portion 95 of the tension spring can be adjusted along the length of the cantilevered member by positioning the bolt 103 at a desired position within the slot 105 for adjusting the tension applied to the end portion 25 of the pivotal member 21.

The tension within the spring 87 can also be adjusted in the embodiment illustrated in FIG. 1 by adjusting the vertical position of the cantilevered or cross member 99 with respect to the support member 13 by securing the end portion 101 at a predetermined location with respect to the slot 107 extending along a portion of the length of the support member 13. In this regard a wing nut 109 and a bolt 111 are provided.

To further assist in securely anchoring the apparatus, particularly in the ground, and to assist in preventing a fish from dragging the rod or fishing pole into the water, an auxiliary anchor such as a screwdriver 113, in the illustrated embodiment, can be secured as through a cord 115 to the slotted end portion 97 of the cross member 99.

In an alternate embodiment, shown in phantom in FIG. 1, the spring 87 can be secured directly at its end portion 95 to the support member 13 with its opposite end portion 89 secured to the end portion 25 of the pivotal member 21.

It will be recognized by those skilled in the art that the triggering force, i.e. the force required to trigger the apparatus from its cocked portion is shown in FIG. 1, can be reduced by positioning the end portion 89 of the tension spring closer to the upright support member 13. Similarly, the triggering force can be reduced by moving the end portion 95 of the tension spring closer to the support member 15 along the length of the cross member 99. Contrawise the triggering force can be increased by moving one or both of the opposite end portions of the tension spring away from the upright support member 13. The vertical adjustment of the cross member 99 with respect to the support member 13 serves to increase or decrease, as necessary or desired, the tension or biasing force within the spring 87.

A trigger assembly 119 serves to maintain the second member 21 in a predetermined pivotal position by countering the forces applied to the second member by the tension spring assembly. The illustrated trigger assembly comprises an elongated trigger 121 is pivotally mounted on the upright support member 13 as by the pin 123. The end portion 125 of the trigger engages a selected one of the plurality of teeth 127 provided in the recess portion of the depending member 27 of the foot member 21. A further tension spring 131 interconnects the foot member 21 and the opposite end portion of the trigger and serves to rapidly disengage the end portion 125 of the trigger and the teeth 127 upon the rod being jerked by a fish in a counterclockwise direction as viewed in FIG. 1.

Figure 6:
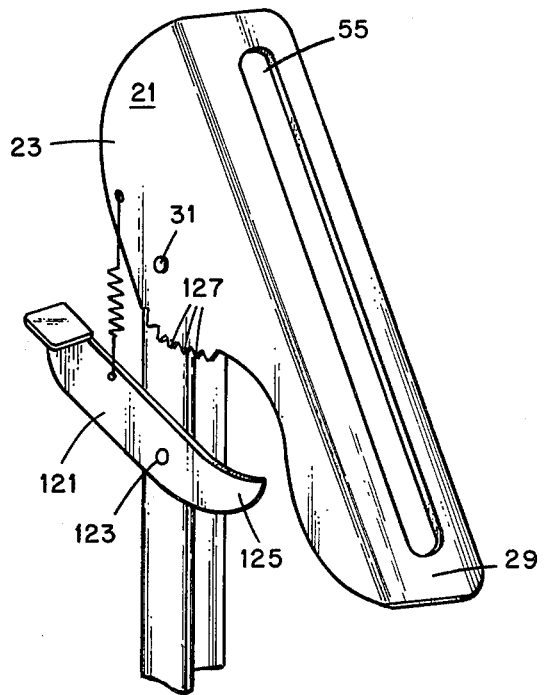
FIG. 6 is a perspective view of a portion of the device showing the upper end portion of the support member, with the trigger and the member pivotally mounted on the upper end portion of the support member in its triggered position.

It will be noted in the Figures that the teeth 127 are arcuate and defined by the wall of the depending member 23 such that the end portion 125 of the trigger can engage a predetermined one of the teeth and position the foot member 21 at a desired pivotal location. This provides a further means for varying the angular position at which the rod is disposed with respect to the horizontal and the support member 13. The recess proximate the teeth 127 serves to receive the end portion 125 of the trigger when the holder is moved to its triggered position in response to a fish jerking on the line as shown in FIG. 6.

An audible alarm is provided to signal a person who is remote or not attending the rod. A suitable bell or the like could be mounted on the foot member 21 such that when the device is triggered the bell generates an audible alarm. It has been found however, that the device is less expensive to manufacture, if certain features, inherent in the disclosed device are used in connection with generating the audible alarm. To this end, a cross member 132 is secured at its end portion 133 to the upright member 13. This cross member extends in a cantilevered manner outwardly from the upright member 13 and frictionally engages at its end portion 135 the tension spring 87. When the device is triggered as by the jerking of a fish on the bait, the tension spring 87 contracts and rubs against the end portion 135 of the cross member and generates a sound to alert the fisherman that a fish is feeding or tugging on the line.

Moreover, the member 132 is positioned such that it engages the spring 87 as when the end portion 95 of the spring is secured directly, as shown in phantom in FIG. 1, to the upright support member 35.

Figure 2A:
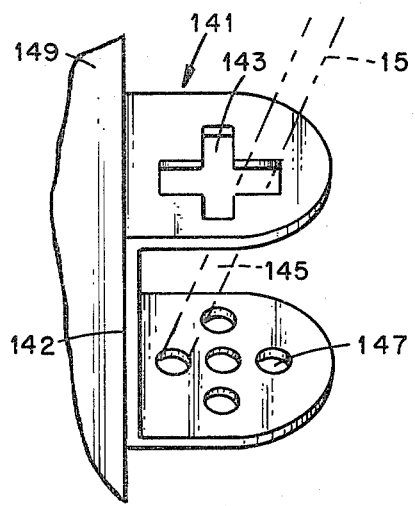
FIGS. 2A and 2B illustrate a bracket suitable for carrying the support member at various angular positions.
Figure 2B:
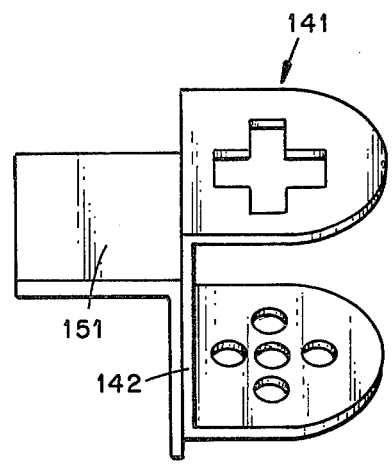

In certain fishing operations, it may be desired to support the upright support member 13 at a predetermined angle with respect to a vertical line. In this connection, a suitable bracket 141 is provided and illustrated in FIGS. 2A and 2B. This bracket is substantially U-shaped in cross-sectional outline and receives the end portion 15 of the upright member through its slotted opening 143 in one bracket plate. The tip 145 of the end portion 15 is positioned in one of the preselected openings 147 defined in the cooperating bracket plate. By positioning the tip 145 of the support member end portion 15 in one of the predetermined openings 147 and inserting the end portion 15 within one of the predetermined slots of the opening 143 the angular position of the support member can be adjusted with respect to a vertical axis. This bracket 141 is suitable for securing as by nuts, bolts, screws, or the like extending through the base plate 142 to a substantially upright member 149 such that the device can be mounted on a tackle box, the side of a boat, the side of a pier, or the like. As necessary or desired an angle iron member 151 can be secured to the bracket to assist in mounting the bracket on a horizontal or other suitable support member.

To further assist in preventing the rod from becoming separated from the holder as when a fish tugs on the rod or when the apparatus is triggered, a safety pin 161 is provided and secured at its opposite ends to upright members 63 which also define the slots 83. This safety pin engages the rod handle, for example, to prevent the rod from pivoting out of the holder as when the apparatus is triggered and the locking mechanism 79 disengages the rod.

From the foregoing detailed description, it will be recognized that an improved apparatus for holding a fishing rod, fishing pole or the like and for setting the hook in a fish's mouth has been disclosed. More specifically, the apparatus is particularly suitable for being inexpensively manufactured and can be readily assembled. The device incorporates, in one embodiment, an audible alarm which utilizes an inherent feature in the illustrated embodiment of the tension spring assembly to create the sound. The position of the rod can be adjusted with respect to the horizontal and with respect to the vertical axes and adjustments are provided for varying the triggering force required to trigger the apparatus from its cocked position. In this connection, the longitudinal position of the rod can be adjusted within the holder, and a plurality of teeth are provided to maintain the rod and engage the real or reel shaft to maintain the rod and reel at a predetermined position. Further, the locking mechanism assists in securing the rod and reel at a predetermined location. Moreover, a triggering force adjustment can be accomplished by adjusting the position of the holder and its supporting bracket 39 along the length of the foot member 21. It will be recognized that the triggering force will be reduced by moving the rod and/or holder in a leftward direction as seen in FIG. 1. The triggering force can also be adjusted by varying the vertical position of the cross member 99 to change the tension within the spring 87. The greater the tension, the more triggering force will be required to trigger the cocked apparatus. Still further, the triggering force of the cocked apparatus can be reduced by moving the opposite end or ends of the spring towards the member 13. The various features of the invention which facilitate adjusting the triggering force add flexibility to the device and can be used separately or in combination to adjust the device triggering force as desired or necessary.

It is, of course, understood that although a preferred embodiment of the present invention has been illustrated and described, various modifications thereof will become apparent to those skilled in the art, and accordingly, the scope of the present invention should be defined only by the appended claims and equivalents thereof.

What is claimed is:
1. A hook setting apparatus which supports a fishing rod connected to a hook through a fishing line and automatically jerks the rod in a direction opposed to the direction a fish tugs on the line such that the hook is set in the fish's mouth, said apparatus comprising:
   a first support member having a first end portion and a further end portion,
   a second member pivotally mounted on said further end portion of said support member, rod holder means mounted on said second member and proportioned for receiving and supporting the handle portion of a rod therein, a tension spring assembly biasing said second member in a predetermined pivotal direction for setting the hook in a fish's mouth, said tension spring assembly includes a tension spring secured at one of its end portions to said second member and secured at its opposite end to said first support member, the position of at least one end of said tension spring being adjustable for varying the biasing force against the second member;

audible alarm means comprising an elongated arm defining a first end portion secured to said first support member said arm extending outwardly in a cantilevered manner from said support member and defining an opposite end portion which frictionally engages the tension spring of said tension spring assembly whereby the rubbing of said spring against said arm generates an audible alarm responsive to the contraction of said spring; and a trigger assembly which maintains said second member in a predetermined pivotal position by counteracting the forces applied to said second member by said tension spring assembly, said trigger assembly releasing said second member responsive to said second member being pivoted by a fish in a direction opposite to the pivotal direction said second member is urged by said tension spring assembly such that said rod holder and rod are pivoted in a direction opposite to the direction said pole is jerked by a fish whereby said hook is set in the fish's mouth.

2. A hook setting apparatus which supports a fishing rod connected to a hook through a fishing line and automatically jerks the rod in a direction opposed to the direction a fish tugs on the line such that the hook is set in the fish's mount, said apparatus comprising:

a first support member having a first end portion and a further end portion, a second member pivotally mounted on said further end portion of said support member, said second member defines first and further end portions and is pivotally mounted on said further end portion of said support member such that the opposite end portions of said second member are disposed on opposite sides of said further end portion of said support member, rod holder means mounted on said second member and proportioned for receiving and supporting the handle portion of a rod therein, a tension spring assembly biasing said second member in a predetermined pivotal direction for setting the hook in a fish's mouth, said tension spring assembly including a tension spring slideably secured at one of its end portions to said further end portion of said second member, a rod member including a first end portion slideably secured to said support member and extending in a cantilevered manner therefrom and a further end portion disposed substantially perpendicularly with respect to said support member, said tension spring being slideably secured at its opposite end to said further end portion of said rod member whereby the biasing force applied by said spring assembly is adjustable such that the force required to trigger the device can be varied with respect to the size of the fish desired to be caught, and a trigger assembly which maintains said second member in a predetermined pivotal position by counteracting the forces applied to said second member by said tension spring assembly, said trigger assembly releasing said second member responsive to said second member being pivoted by a fish in a direction opposite to the pivotal direction said second member is urged by said tension spring assembly such that said rod holder and rod are pivoted in a direction opposite to the direction said pole is jerked by a fish whereby said hook is set in the fish's mouth.

3. A hook setting apparatus which supports a fishing rod connected to a hook through a fishing line and automatically jerks the rod in the direction opposed to the direction a fish tugs on the line such that the hook is set in the fish's mouth, said apparatus comprising:

a first support member having a first end portion of said support member, said second member defining first and further end portions such that the opposite end portions of said second member are disposed on opposite sides of said further end portion of said support member, rod holder means mounted on said second member and proportioned for receiving and supporting the handle portion of a rod therein, said rod holder means defining a plurality of teeth suitable for engaging the shank of a reel mounted thereon to assist in preventing the rod from becoming disengaged from said rod holder means, a tension spring assembly biasing said second member in a predetermined pivotal direction for setting the hook in a fish's mouth, said tension spring assembly including a tension spring secured at one of its end portions to said second member and secured at its opposite end portion to said first support member, the position of at least one end of said spring being adjustable for varying the biasing force against the second member, a trigger assembly which maintains said second member in a predetermined pivotal position by countering the forces applied to said second member by said tension spring assembly, said trigger assembly releasing said second member responsive to said second member being pivoted by a fish in the direction opposite to the pivotal direction of said second member is urged by said tension spring assembly such that said rod holder and said rod are pivoted in the direction opposite to the direction said pole is jerked by said fish whereby said hook is set in the fish's mouth, and an audible alarm means comprising an elongated arm defining a first end portion secured to said first support member said arm extending outwardly in a cantilevered manner from said support member and defining an opposite end portion which frictionally engages the tension spring of said tension spring assembly whereby the rubbing of said spring against said arm generates an audible alarm responsive to the contraction of said spring.

* * * * *